United States Patent Office 2,802,115
Patented Aug. 6, 1957

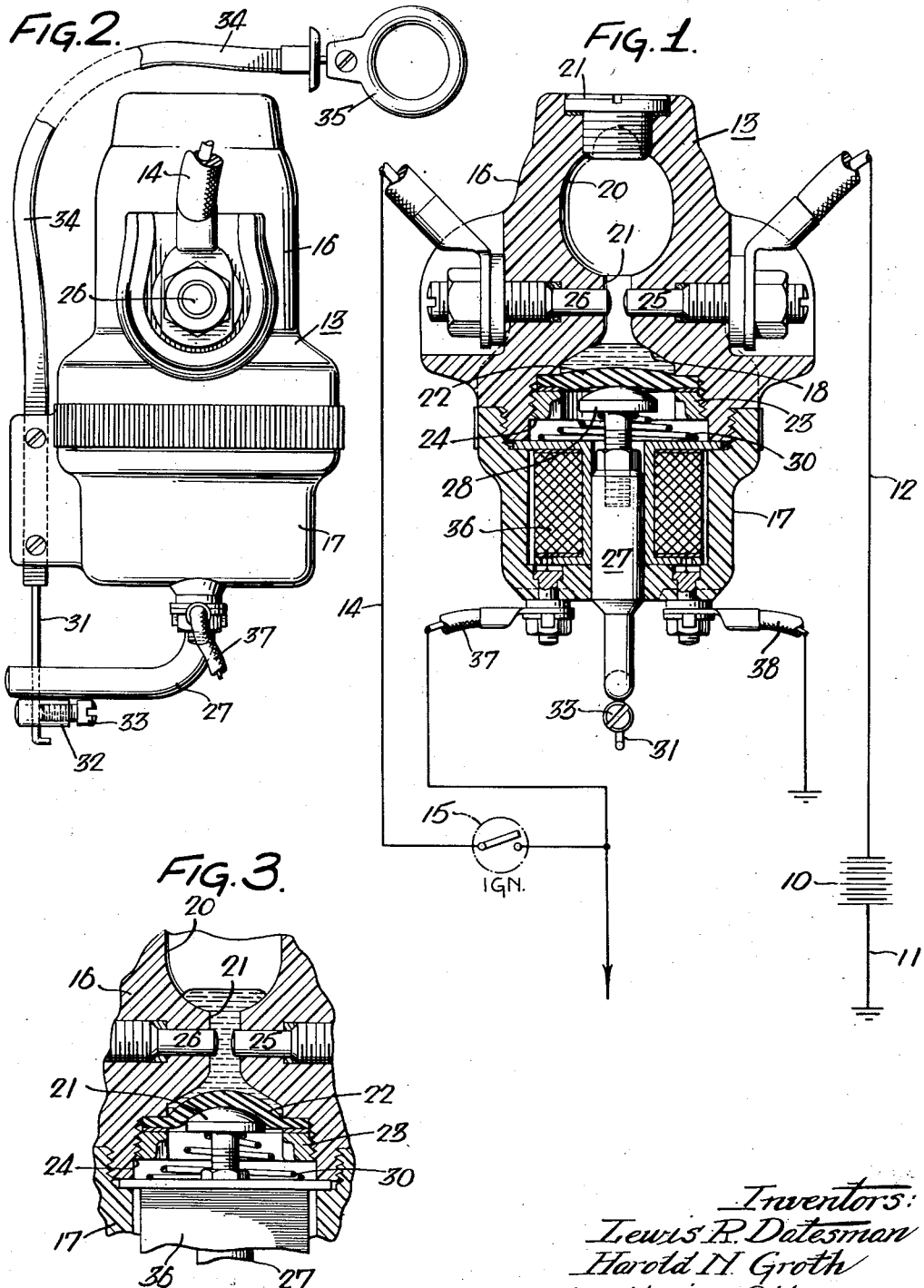

2,802,115

SAFETY SWITCH AND CIRCUIT

Lewis R. Datesman, Quakertown, and Harold N. Groth, Lansdale, Pa.

Application March 30, 1954, Serial No. 419,731

3 Claims. (Cl. 307—10)

The present invention relates to the electrical systems of vehicles and more particularly to a safety switch control for the ignition system of an automobile, boat, and the like.

In ignition systems now and heretofore in use the primary circuit is controlled by a single switch for opening and closing the circuit and therefore some disadvantages and hazards are present at all times. One such disadvantage is the chance of having the car stolen by carelessly leaving the key in the switch. Another is where the key has been taken out and a thief can then use a jumper wire around the switch to steal the car. Again there is the danger of fire following an accident which occurs too quickly for the driver to turn off the switch.

An object of the present invention is to provide a safety control for an automobile ignition system as a means to eliminate the foregoing objections and hazards.

Another object is to provide an auxiliary concealed switch as a part of an ignition circuit whereby the circuit cannot be closed by the usual ignition key switch, unless the auxiliary switch and its operation is known.

Another object is to provide a control for an ignition system of an automobile wherein means are provided to automatically open the primary circuit thereof in case of a collision or such an accident as might cause a live circuit to ignite stray gasoline.

A further object of the invention is to provide a control for the electrical system of a vehicle whereby the entire electrical circuit may readily be deenergized in order to effect repairs safely and wherein further the circuit remains open when the vehicle is not in use, thereby eliminating the possibility of a short circuit which may cause drain on the battery and even a fire.

Another object of the invention is to provide a control for the electrical system of a vehicle wherein inadvertent operation of the vehicle by a child is impossible.

In the accompanying drawings,

Fig. 1 is a view of an ignition system embodying one form of the present invention and showing a vertical section of the auxiliary switch as included in the circuit;

Fig. 2 is a side view of the auxiliary or safety switch mounted in operative position; and Fig. 3 is detail sectional view of the circuit terminals connected by the switch operating parts.

Referring to the drawings, one form of the present invention comprises an electrical circuit including a source of voltage 10 having one pole leading by a conductor 11 to ground and the other pole connected by a conductor 12 to a switch 13 from which a conductor 14 leads through the usual circuit ignition switch 15 to the ground. Thus it will be seen that the primary circuit includes two switches in series relation, of which switch 13 is here designated the safety or auxiliary switch.

In the present instance the switch unit 13 comprises a housing of insulating material preferably made in two superposed parts 16 and 17 threaded or otherwise interconnected. The part 16 houses the switch part proper and the part 17 houses the control for that switch. Considering the switch assembly, this part 16 is formed with two vertically spaced apart chambers 18 and 20 interconnected by a restricted passage 21, the former 18 serving as a reservoir for mercury or other conductive liquid, and the latter 20 serving as a spill-over chamber 20 for liquid emptying from the reservoir by tilting of the unit from its vertical position to a horizontal or inverted position. Also it should be noted that the chamber 20 has sufficient volume to compensate for displaced air under the aforesaid abnormal positions. A plug 21 closes a filling opening which is necessary to introduce the control liquid to the reservoir. The bottom of the reservoir 18 is formed by a flexible diaphragm 22 held in place by a ring 23 threaded into the axial opening 24.

For circuit control the conductor 12 connects to a binding post terminal 25 laterally entering the housing to emerge into the passage 21, while the conductor 14 connects to a binding post terminal 26 laterally entering the housing to emerge into the passage 21 and assume a position juxtaposed to the terminal 25, the spaced apart relation being such that a relatively small column of projected mercury will bridge the space to close the circuit at these terminals. From the foregoing it will be seen that the two terminals 25 and 26 lie in the same horizontal plane which intersects the vertical plane of the passage 21.

In order to manually displace the mercury in the reservoir, a vertically disposed armature plunger 27 enters the housing part 17 in axial alignment with the passage 21 to terminate in a head 28 pressed to normal contact relation with the diaphragm 22 by a compression spring 30, which latter also serves as a support for the plunger 27. The lower end of this plunger 27 protrudes from the housing and is laterally bent and apertured for the passage of an operating wire 31, to which a lift member 32 is adjustably attached by a set screw 33 to take an abutting position against the underside of the plunger part. The wire 31 is carried by a flexible cable 34 leading to a convenient place for operation, and concealed under the dash or other inconspicuous place, where it terminates in a pull ring 35. Thus by pulling the wire 31, the plunger 27 is shifted upwardly and thereby compress the diaphragm and force the mercury to bridge the contacts, thus closing the auxiliary or safety circuit.

As a means for holding the plunger 27 in this contact position, it forms the core or armature of a solenoid including the coil 36 from which conductor 37 leads to circuit conductor 14, and conductor 38 leads to the ground. Thus the switch 13 is in series with the ignition switch 15. Now with the switch 13 closed by the manual operation, the switch 15 can be closed, thereby not only energizing the magnet to hold the armature plunger 27 in closed contact position but also to close the primary circuit for automobile operation. The pull ring 35 is then returned to the position shown in Fig. 1, in which position the lift member 32 carried by the wire no longer abuts against the underside of the plunger part. When the ignition switch 15 is opened by turning or removing its key, plunger 27 drops by its own weight assisted by the retraction of the diaphragm and the pressure of the air in the chamber 20 to open the safety switch 13, and the system is again under safe control. When it is desired to operate the auxiliary lights of the vehicle when the engine is not in operation the electrical circuit may be energized merely by pulling the ring 35 and retaining it in extended position by any suitable means (not shown).

In the case of a car collision whereby the safety switch is turned to a position where the mercury is discharged by gravity into the spill-over chamber 20 the mercury contact between the terminals 25 and 26 is broken and the primary circuit is no longer alive, thus removing the hazard of a fire.

It will now be apparent that a complete safety control system has been devised for the ignition circuit thereof wherein two switches function sequentially in place of a single ignition switch as heretofore, one of such switches being concealed and normally open so that the ignition switch in that situation is non-functional. Furthermore the control system operates automatically to open all live circuits in case of accidents causing the safety switch to assume such an abnormal position as will empty the reservoir into the spill-over chamber. The control system of the present invention renders the entire electrical circuit of an automotive vehicle inoperative while the vehicle is not in use. By this arrangement the danger of a short circuit which would drain the battery, and possibly cause a fire, is eliminated. In the event of electrical fire while the vehicle is in use the entire circuit can be immediately opened by the safety control switch above described. The auxiliary lights of the vehicle may be energized when the engine is not in operation merely by pulling the ring 35. The ring may be retained in this extended position by any suitable means.

Having described our invention, we claim:

1. A safety switch for the electrical circuit of automotive vehicles comprising a normally vertical dielectric casing having an upper chamber and a collapsible lower reservoir joined by a passage of reduced cross-section, conductive elements communicating with said conduit portion, non-compressible conductive fluid having a volume less than the volume of said upper chamber and the normal volume of said lower chamber, said fluid being normally disposed in said lower compartment, means to collapse said lower reservoir to a volume less than the volume of said fluid to urge said fluid into said passage and into contact with said conductive elements to cause energization of the circuit, said fluid being adapted to flow into said upper compartment and out of contact with said conductive elements upon upset of the vehicle.

2. A control system for connecting a source of voltage to an automotive wiring circuit to energize the latter comprising a manually operable ignition switch and a normally open mercury switch disposed in series relation between said source and said wiring circuit, a plunger in said mercury switch operable in one limit position to close said mercury switch and in the opposite limit position to open said mercury switch, means normally biasing said plunger to said opposite limit position, manually operable means to displace said plunger to said one limit position against said bias means, and solenoid means connected in parallel with said wiring circuit and energized upon energization of the latter to overcome the bias of said bias means and retain said plunger in said one limit position.

3. A control system according to claim 2 wherein said mercury switch consists of two terminals, a housing mounting said terminals in spaced apart relation, said housing having an upper chamber, a lower collapsible reservoir, and a restricted passage therebetween intercepting said terminals, mercury in said reservoir having a volume less than the volume of said upper chamber and the normal volume of said lower chamber, and wherein further said plunger in said one limit position collapses said lower reservoir to a volume less than the volume of said mercury to shift the mercury into said passage to afford electrical communication between said contacts.

References Cited in the file of this patent

UNITED STATES PATENTS

| | | |
|---|---|---|
| 375,403 | Waterhouse | Dec. 27, 1887 |
| 1,740,896 | Kilgour | Dec. 24, 1929 |
| 2,192,262 | Griesedieck | Mar. 5, 1940 |
| 2,290,124 | Colby | July 14, 1942 |
| 2,304,608 | Smythe | Dec. 8, 1942 |